US009160806B1

(12) United States Patent
Ledet

(10) Patent No.: US 9,160,806 B1
(45) Date of Patent: Oct. 13, 2015

(54) METHOD AND APPARATUS OF ORGANIZING AND DELIVERING DATA TO INTENDED RECIPIENTS

(75) Inventor: David Gerard Ledet, Allen, TX (US)

(73) Assignee: Open Invention Network, LLC, Durham, NC (US)

(*) Notice: Subject to any disclaimer, the term of this patent is extended or adjusted under 35 U.S.C. 154(b) by 196 days.

(21) Appl. No.: 13/198,556

(22) Filed: Aug. 4, 2011

Related U.S. Application Data

(60) Provisional application No. 61/370,574, filed on Aug. 4, 2010, provisional application No. 61/370,584, filed on Aug. 4, 2010.

(51) Int. Cl.
G06F 15/16 (2006.01)
H04L 29/08 (2006.01)
G06F 17/30 (2006.01)

(52) U.S. Cl.
CPC ........ *H04L 67/306* (2013.01); *G06F 17/30699* (2013.01)

(58) Field of Classification Search
CPC ............ H04L 65/1066; H04L 65/4038; H04L 67/327; H04L 45/308; H04L 67/306; G06F 17/30029; G06F 17/30699; G06F 17/30828; G06F 2207/025; G06F 9/3891; G06F 17/30
See application file for complete search history.

(56) References Cited

U.S. PATENT DOCUMENTS

| 6,480,885 | B1 * | 11/2002 | Olivier | 709/207 |
| 8,312,090 | B2 * | 11/2012 | Anderson | 709/206 |
| 8,346,864 | B1 * | 1/2013 | Amidon et al. | 709/204 |
| 8,676,887 | B2 * | 3/2014 | Kim et al. | 709/204 |
| 2002/0002586 | A1 * | 1/2002 | Rafal et al. | 709/205 |
| 2005/0182675 | A1 * | 8/2005 | Huettner | 705/14 |
| 2006/0277317 | A1 * | 12/2006 | Clark et al. | 709/235 |
| 2007/0208614 | A1 * | 9/2007 | Arnett et al. | 705/10 |
| 2009/0144377 | A1 * | 6/2009 | Kim et al. | 709/206 |
| 2010/0017371 | A1 * | 1/2010 | Whalin et al. | 707/3 |
| 2012/0159246 | A1 * | 6/2012 | Paramasivam et al. | 714/23 |

* cited by examiner

Primary Examiner — Yves Dalencourt
Assistant Examiner — Kidest Mendaye
(74) Attorney, Agent, or Firm — Haynes and Boone, LLP

(57) ABSTRACT

Disclosed are an apparatus and method of transmitting a message to a plurality of data recipients subscribed to receive information from a leader. An example method of operation may include transmitting a message intended for the plurality of data recipients, analyzing content of the message to determine a category corresponding to the content and matching the message with the category. The method may also include determining that only a subset of the plurality of data recipients are configured to receive the message based on the determined category, and transmitting the message to the subset of the plurality of data recipients.

11 Claims, 8 Drawing Sheets

| User | Category | Messages |
|---|---|---|
| @johnsmith | Running | Msg[2] |
| | | Msg[7] |
| | Biking | Msg[3] |
| | Apps | Msg[5] |
| | | Msg[12] |

| User | Category | Messages | Followers |
|---|---|---|---|
| @johnsmith | Running | Msg[2] | @problogging @dbrockwood @jalexander |
| | | Msg[7] | @alltuit |
| | Biking | Msg[3] | @coolblogger |
| | Apps | Msg[5] | @bstankin @suzisparks @muzylatch @blackpuckett |
| | | Msg[12] | @rustinghouse @catplayer @foodcypher |

METHOD AND APPARATUS OF ORGANIZING AND DELIVERING DATA TO INTENDED RECIPIENTS

CROSS REFERENCE TO RELATED APPLICATIONS

This application claims benefit to provisional application No. 61/370,574, entitled "Ordering recipients in social networking", filed on Aug. 4, 2010, and to provisional application No. 61/370,584, entitled "Managing recipients in social networking", filed on Aug. 4, 2010, the entire contents of which are hereby incorporated by reference.

TECHNICAL FIELD OF THE INVENTION

This invention relates to a method and apparatus of organizing groups of users, subscribers and/or recipients of data, and more specifically, to organizing groups of users as intended data recipients based on user preferences.

BACKGROUND OF THE INVENTION

Within the realm of social networking, the number of friends/followers/recipients is an indication of the relative level of success a user will have at sharing information. Famous individuals, corporate entities and other well established user accounts on social networking websites are constantly identified and have the potential to reach millions of friends/followers/recipients (for simplicity purposes the friends/followers/recipients will be referred to as data recipients or 'recipients'). However, when the number of recipients reaches into the thousands, the social networking paradigm begins to break down.

It may be said that small and obscure groups of people who are passionately interested in a specific subject may be more likely to focus on finite tasks and accomplish their goals. Online social networking tools should be capable of fostering these sorts of clusters. But, when the conversation grows too large the focuses are often expanded and the recipients may lose interest quickly. Not only do audiences of recipients feel estranged, the participants also start self-censoring. People who suddenly find themselves with really large audiences often start writing more cautiously and behaving like politicians or corporate drones.

In one example, if someone or one user account has obtained 1.5 million recipients on a data messaging application, clearly they are among the rare and famous online individuals. Their response and data messages may include anything as they have already reached instant frame. In another example, if you have a hundred followers, you may be considered to just be merely chatting with pals. The middle ground—when someone amasses, roughly several thousand recipients, the social aspect of social media begins to fall apart by trying to keep their interests perked.

FIG. 1 illustrates a graph depicting a number of data posts on a social networking user account in relation to a number of followers or data recipients of that particular user account. Referring to FIG. 1, it can be noted that the number of posts leveled-out after a user obtained 400 followers. According to the graph, it can therefore be theorized that once a user has more than 400 followers. The user account or sender did not increase the number of posts, but the number of posts remained around the 800 level.

The intimacy of the social network begins to change when the number of recipients grows into the thousands. For example, unlike when there are a limited number of followers, the user or sender begins to believe the recipients are satisfied with the content of the posts being sent. As the number of recipients grows, the user is hesitant to share the same intimate subject matter, but becomes naturally more political and concerned that the recipients may not be interested in the narrow scope of certain posts. As a result, the timeliness in receiving a response from a user's posts (feedback) may begin to diminish or disappear completely.

A British anthropologist, Robin Dunbar, theorized that the maximum size of a social group in which everyone involved could maintain a mental record of all of the interpersonal relationships was 150. This is considered "Dunbar's number." These are relationships in which an individual knows each person and how each person relates to every other person. Numbers larger than 150 generally require more restrictive rules, laws, and enforced norms to maintain a stable and cohesive group.

Dunbar's number is possibly one reason why users are more careful in posting messages to a large number of followers. Managing a large number of recipients is not easy, but the success and influence is directly proportional to the activeness of the recipients. Recognizing the behavior of the recipients may also provide insight into how to maintain their satisfaction with the content of the posts. Some of the factors that will determine the influential power of the posts and messaging may include the activeness of the recipients (feedback), the forwarding activity of the messages (sharing), the currency with which the recipients respond, etc.

Managing a large and possibly increasing number of recipients may require certain modifications to the messaging application used to share information (e.g., social networking website, blog, group messaging, etc.). For example, with short messaging service (SMS) applications, the notion of groups includes followers or recipients who are tagged into different groups. The leader is then enabled to send data messages to one of the groups without the need of sending individual messages to each person, or sending a single message to all of the followers. Groups are viewed as a way to organize many people within a single group and to obtain more followers for each group. When a group is organized, all members of the group automatically follow the data messages posted for that group, and the leader may automatically follow the individuals as well. A leader may obtain more followers by joining a group. When a group is created, it is unique and no one can replicate that specific group. Therefore, the "administrator" of that group may be viewed as the expert. Anyone who joins that group will follow the leader or administrator of the group.

Groups provide a social networking option for those leaders with a relatively small number of followers. The group situation becomes increasingly difficult to manage with a leader that already has a large number of recipients or is observing a significant increase in the number of recipients. Another concern is that the leader will not be able to divide all of the users into the correct group(s). The group strategy may be best utilized for leaders that do not have a large number of recipients.

Multiple user accounts is another strategy to allow the leader to obtain a number of updates from a subset of recipients who are controlled by the leader. There are existing applications that allow leaders to maintain multiple messaging accounts and centrally manage those accounts. For example, when the leader is replying to the recipients, there is a function (e.g., a button on the "compose" message screen) that permits the leader to switch the "sender" or leader's account. The leader can setup a "follow"-only account, and when replying to something from that account, a simple sending option may permit the reply to be sent form the leader's "real" account. None of these examples provide the success desired by the social networking leaders and recipients. Many leaders are not satisfied with having multiple user accounts or managing each individual recipient among many others. The efficiency and productivity of managing a social network requires additional measures to be enacted.

SUMMARY OF THE INVENTION

One embodiment of the present invention may include a method of transmitting a message to a plurality of data recipients subscribed to receive information from a leader. The method may include transmitting a message intended for the plurality of data recipients, analyzing content of the message to determine a category corresponding to the content, matching the message with the category, determining that only a subset of the plurality of data recipients are configured to receive the message based on the determined category, and transmitting the message to the subset of the plurality of data recipients.

Another example embodiment of the present invention may include an apparatus configured to transmit a message to a plurality of data recipients subscribed to receive information from a leader. The apparatus may include a transmitter configured to transmit a message intended for the plurality of data recipients. The apparatus may also include a processor configured to analyze content of the message to determine a category corresponding to the content, match the message with the category, and determine that only a subset of the plurality of data recipients are configured to receive the message based on the determined category. The transmitter is also configured to transmit the message to the subset of the plurality of data recipients.

BRIEF DESCRIPTION OF THE DRAWINGS

FIGS. 4 and 5 illustrate example tables of messages being paired with particular users, categories and followers, according to example embodiments of the present invention.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, a management application embodied on a computer device (e.g., server, personal computer, laptop, tablet device, mobile station, smartphone, etc.) may be configured to automatically assist a user of a social networking application. The management application may be an add-on application, patch application, middleware application and/or a separate application that when executed assists a user, manager or leader of an existing social network application with managing a large number or a growing number of data followers, recipients, or subscribers (hereafter 'recipients'). The data recipients may be subscribed to one or more sources of information managed by the leader via the social networking application.

Figure 1:
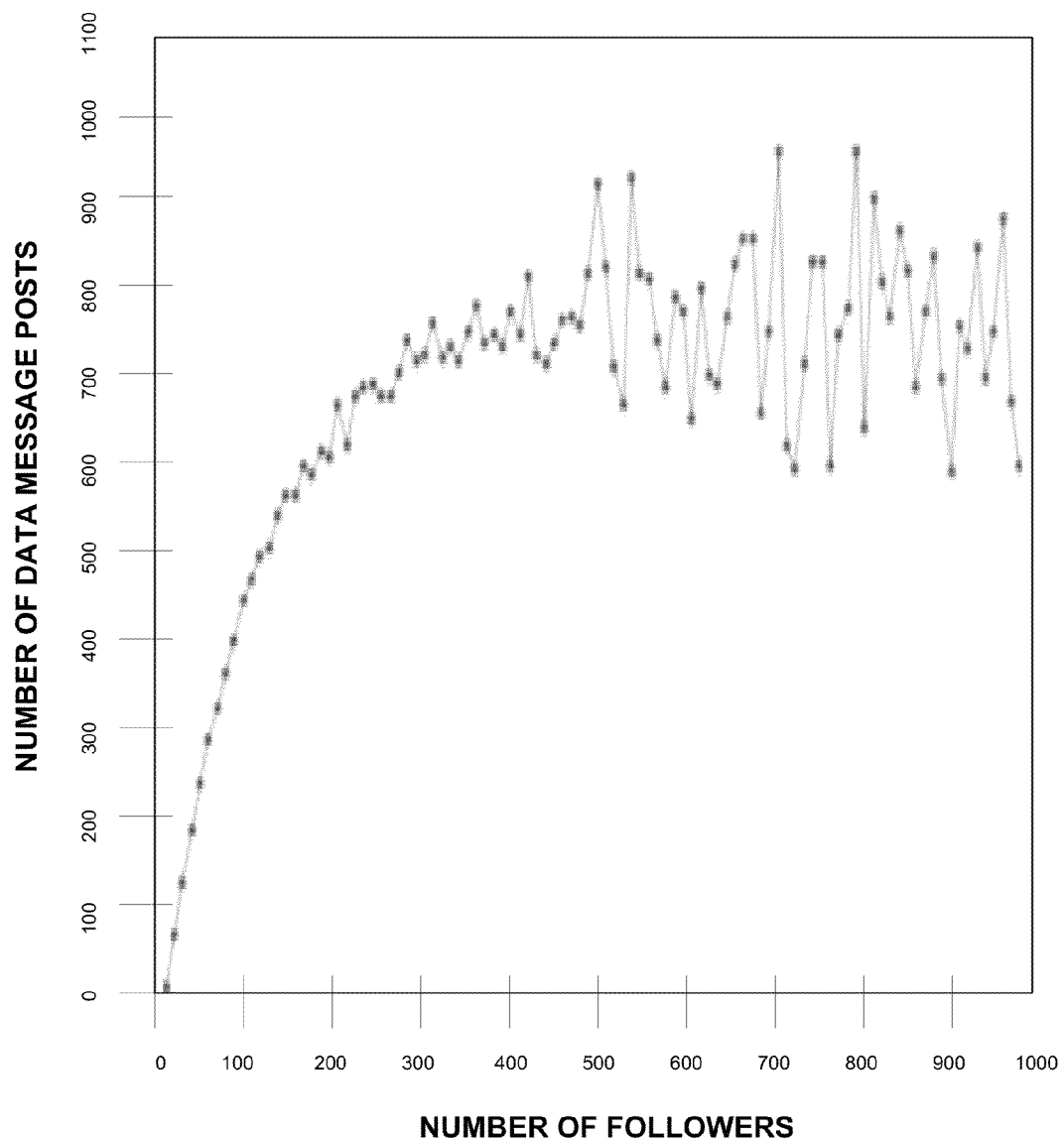
FIG. 1 illustrates an example graph of social networking message posts versus a number of data recipients, according to example embodiments of the present invention.

FIG. 1 illustrates an example network configuration used to provide the leader 101 with access to a social networking application and group of corresponding data recipients, according to example embodiments of the present invention. Referring to FIG. 1, the management application may be installed on the leader's user machine 102 which is connected to the Internet 100. The leader's machine 102 may connect to one or more known social networking websites and/or applications 120 (e.g., LinkedIn®, Twitter®, hi5®, Facebook®, bebo®, Orkut®, MySpace®, Friendster®, etc.). The social networking site may provide access to large numbers of users who may subscribe as data recipients 104 to the leader's special interest group, blog, topic, board, etc.

The management application may assist the leader 101 with managing or leading the data recipients 104 with items such as posting and delivering the data posts (e.g., text posts, video link posts, photograph posts, links, etc.). The posts initiated and created by the leader 101 may be delivered to a subset or portion of the data recipients 104. The subset of data recipients 104 may represent a portion of the total data recipients 104 who are interested in a current topic of interested that is being posted, which can include text, video, audio, multimedia, or any other form of data that is related to any particular topic (e.g., science, culture, politics, news, entertainment, etc.). Limiting the total number of data recipients to certain special interest groups may provide automated and targeted data post transmissions to certain end users based on the recipient's interests. Instead of sending each post generated by a leader to all of the subscribed data recipients, profiling the data recipients and organizing them by their known interests may yield optimal results. Instead of fearing that the number of data recipients 104 in a single account is growing too large, the leader 101 may be assured that the posts are sent to the data recipients that are most interested in what the user is posting at any given time.

Example embodiments of the present invention may provide procedures for automatically assisting leaders with a large number or a growing number of data recipients. For example, by helping the leaders to deliver posts to a subset of all of the data recipients 104 or 'followers' who are more interested in the present topic currently being posted by the leader 101. The leader 101 may be assisted by a managing application that permits a large number of data recipients 104 or a growing number of data recipients 104 to automatically send posts pertaining to the follower's interests instead of sending each post to all data recipients 104. As a result, instead of trying to prevent the number of data recipients 104 from growing too large, the leader 104 is assured that their posts are sent to the data recipients 104 that are most interested in what the user is posting at any given time, which provides a more personalized experience for all data recipients 104.

Example embodiments provide ways to calculate dividing the number of data recipients 104 internally to the managing application according to the data recipients 104 that have interest in the presently posted message(s). The interest that a given data recipient 104 has with a given post is determined by certain criteria as described in below.

According to one example configuration, a leader 101 may post messages about two topics, such as bicycle racing and running. The data recipients 104 of the leader 101 normally receive all messages from the leader 101 concerning those two topics. The leader may amass over 300 data recipients 104, and may regularly receive responses by one or more of those data recipients 104 to outgoing message posts as well as notifications that the data recipients 104 have forwarded the messages. As the number of data recipients 104 increases to over 300, the leader 101 may notice that the number of responses and message forwards begins to level-off, and even decrease in certain instances. The leader's social network may have become too large, and even though the leader 101 continues with the same number of outgoing posts, the number of responses received and message forwards to other data recipients begins to lower, even though the number of data recipients 104 has increased. Further, the ability for the leader 101 to effectively reply to a similar percentage of posts decreased as the number of data recipients 104 begins to increase.

In this example, it may be optimal to split the data recipients 104 of the leader 101 to those that are interested in both running and bicycling as one group, those that are interested in only running as a second group and those that are interested in only bicycling to a third group. It is important to note that certain data recipients 104 may be part of more than one group, however, those individuals may be identified so that they do not receive multiple messages pertaining to all of the groups if necessary.

In order to divide the data recipients 104 among the different groups, it may be determined that if a data recipient 104 has consistently, over a certain amount of time or after a certain amount of posts, responded to a post concerning bicycling or has consistently forwarded messages to others, then that data recipient is most likely interested in bicycling, and not as interested in running. Therefore, the present managing application may propose to split the data recipients 104 of the leader 101 according to their specific interest.

Figure 3:
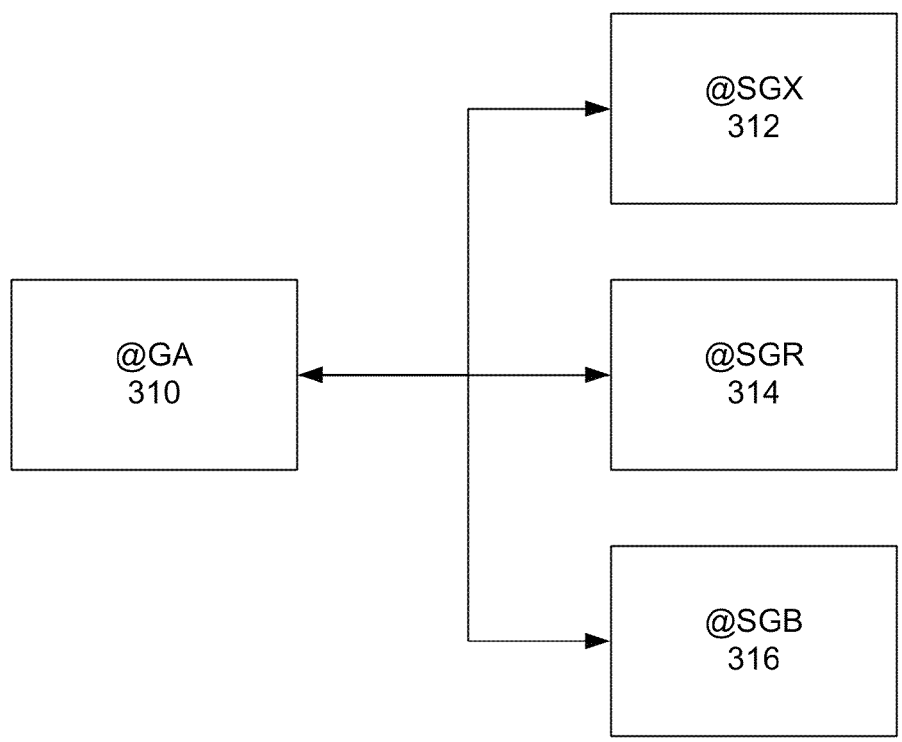
FIG. 3 illustrates an example division of followers or data recipients into smaller groups, according to an example embodiment of the present invention.

Referring to FIG. 3, the split among the data recipients 104 may be performed automatically by the managing application. The data recipients 104 of the leader 101 may be initially identified as a master group (Group All, or @GA 310). The master group @GA 310 may then be split into smaller groups of data recipients 104 that are interested in bicycling (sub-group bicycling, or @SGB 316). The data recipients 104 that are interested in running (sub-group running, or @SGR 314). The data recipients 104 that have no interest in any post may be deemed sub-group X, or @SGX.

The data recipients 104 that have never shown any interest by not forwarding messages and/or responding to data messages received may continue to receive all posts for a predetermined amount of time. Afterwards, the data recipients 104 are queried by the managing application to determine if they desire to continue to receive posts submitted by the leader 101. This query action is optional and attempts to ensure that all data recipients 104 are engaged. According to one example, sporadic posts may be sent, over a certain amount of time or after a certain amount of posts, covering running to data recipients 104 that were most probably interested in bicycling, for example, in an attempt to determine conclusively that the follower was not interested in running.

The number of data recipients 104 may be matched to a threshold causing the splitting of the data recipients 104 into sub-groups which represent a subset of all the data recipients 104 (e.g., 10%, 50%, 80% of all data recipients, etc.). A predetermined threshold may be set to indicate a maximum number of data recipients 104 that may be reached prior to taking a sub-group action. The threshold may be configured by the leader 101 and/or can be a pre-set. When the threshold is reached, the managing application will determine the interests of the data recipients 104, and will use that determination to split the data recipients 104 into proper 'sub-groups.' Once the sub-groups are created, the data recipients 104 will only receive messages that are of interest to them based on the predefined content filters of the sub-groups (e.g., only bicycling, or running or both, etc.). If the leader 101 posts messages that are generic in nature, and do not fall into a category of any of the sub-groups then that message will generally be delivered to all data recipients 104. Once the sub-groups are determined, the data recipients 104 will either receive posts that are of interest to them and/or receive posts that are generic in nature.

For determining a data recipient's 104 interest, each of the message posts that are sent by the leader 101 are analyzed, and key words are stored by the managing application. When a message is posted by the leader 101, the managing application can store the message in memory prior to sending the message out to the data recipients 104, or store it and send it at the same or nearly the same time. The managing application then proceeds with the analysis of the outgoing message.

When analyzing a message, the content of the message is parsed. The parsing breaks-up the sentence into individual words as well as determines the parts of speech of each of the words in the message. There are various sentence parsing tools available on the market that will analyze sentences and one skilled in the art would appreciate that a variety of different word parser application would suffice to parse the content of the data message. APIs are used to convert text into indexable/searchable tokens. Published Java application program interfaces (APIs) perform tokenization for breaking of input text into small indexing elements or tokens. Some of the other analysis tools included in the Java package may include stemming for replacing the words by their stems. For instance, with English for stemming "bikes" is replaced by "bike"; which allows a query for "bike" to retrieve both documents containing "bike" and those containing "bikes."

Other parsing tools may include stop words filtering of common words, such as "the", "and" and "a", which rarely add any value to a search. Removing these common words may shrink the index size and increase performance. It may also reduce unsatisfactory results and actually improve search quality. Text normalization may be used for stripping some or all accents and other character markings which can make for better searching. Synonym expansion may be used for adding in synonyms at the same token position as the current word to obtain more accurate word matching when users search with words in the synonym set.

Utilizing the above-noted tools, the outgoing message is parsed and broken into individual words, showing the articles of speech of each of the words in the sentence (subject, noun, verb, and adverb). Once the message is parsed, the parts of the sentence that are not needed are discarded, for example, the subject, adjectives, and adverbs. What is left is then considered the main parts of the message, and these words are stored as the categories of the message. These categories are stored by the managing application as the main words of the outgoing message.

To determine the user interests of the data recipients, categories may be sued for analyzing the message posts of the leader 101 or the response postings of the data recipients 104. Internal to the managing application of the current invention is a table that stores the user's categories, and the messages associated with the categories. An example of the user's category table is illustrated in FIG. 4.

Referring to FIG. 4, a table 400 illustrates three subjects, user, category and messages. The depiction of the internal category table of the user in FIG. 4 includes the user of the application (John Smith) who is found to have three categories associated with previously submitted messages: running, biking, and apps. The table 400 also stores the outgoing messages pertaining to the respective categories in the table. For this example, all outgoing messages are represented in an array of messages entitled Msg[x]. For the running category, two messages are found that were found to be related to running. The second and seventh elements (e.g., Msg[2] and Msg[7]) of the message array are stored in the "Running" category. The third element of the message array is stored in the "Biking" category, and the fifth and twelfth elements of the message array are stored in the "Apps" category.

Any outgoing messages found to have a form (i.e., synonym, related term, etc.) of the category word will be paired with the specific category. For example, if the outgoing message contains the word "Run", or "Ran", or "Running," "Jogging," "Sprinting," or a similar term, then the managing application will assign the "Running" category for that particular message. To determine the proper category of words in the message, the managing application can utilize any of the various applications available today. One application is a .NET library for performing word stemming which is an API for .NET applications that can be used to find the root of a word, for example, the root of "running" is "run". Utilizing these $3^{rd}$ party applications, the managing application of the current invention is enabled to properly assign the message to its respective category.

The responses of the data recipients 104 are recorded as well as when a data recipient forwards a message to another user. All of the data recipients 104 are stored in the managing application and a record is made of which data recipients 104 fall into one or more of the categories offered by the content of the leader 101. For example, if the leader 101 posts the following message "Looking forward to the upcoming Run for the Zoo race in downtown Chicago." The managing application of the will analyze the message content and determine that the message falls into the "Running" category by keying in on the word "run". The managing application utilizes word parsing applications to perform a "message analysis" to determine that the race mentioned by the user in the message pertains to running.

Therefore, the "running" category is created by the managing application responsive to the leader's submitted message posting, or the category may have already existed from a previous word analysis. Each of the responses to the message, or messages forwarded to the data recipients 104 is recorded by the managing application. Therefore, if a data recipient 104 responds to the message, or forwards the message, that data recipient will be placed into the "Running" category, and stored with the respective outgoing messages from the leader 101.

The table 500 of FIG. 5 illustrates additional details according to example embodiments. Referring to FIG. 5, table 500 provides the internal category table with data recipients 104. For example, three data recipients 104 @problogging, @dbrockwood, and @jalexander have responded to or forwarded the message "Msg[2]", and have been internally stored as data recipients associated with having performed an action with respect to "Msg[2]", which is an outgoing post in the "Running" category. One data recipient (@alltuit) has been associated with the outgoing message "Msg[7]" in the running category. This message may be similar or different from "Msg[2]", however, the category is still related to "Running." In another example, it is also possible for a data recipient to be placed in two or more categories. For example, if the data recipient would have showed interest in running and biking, that follower would be placed both in the running category, as well as the biking category.

Figure 6:
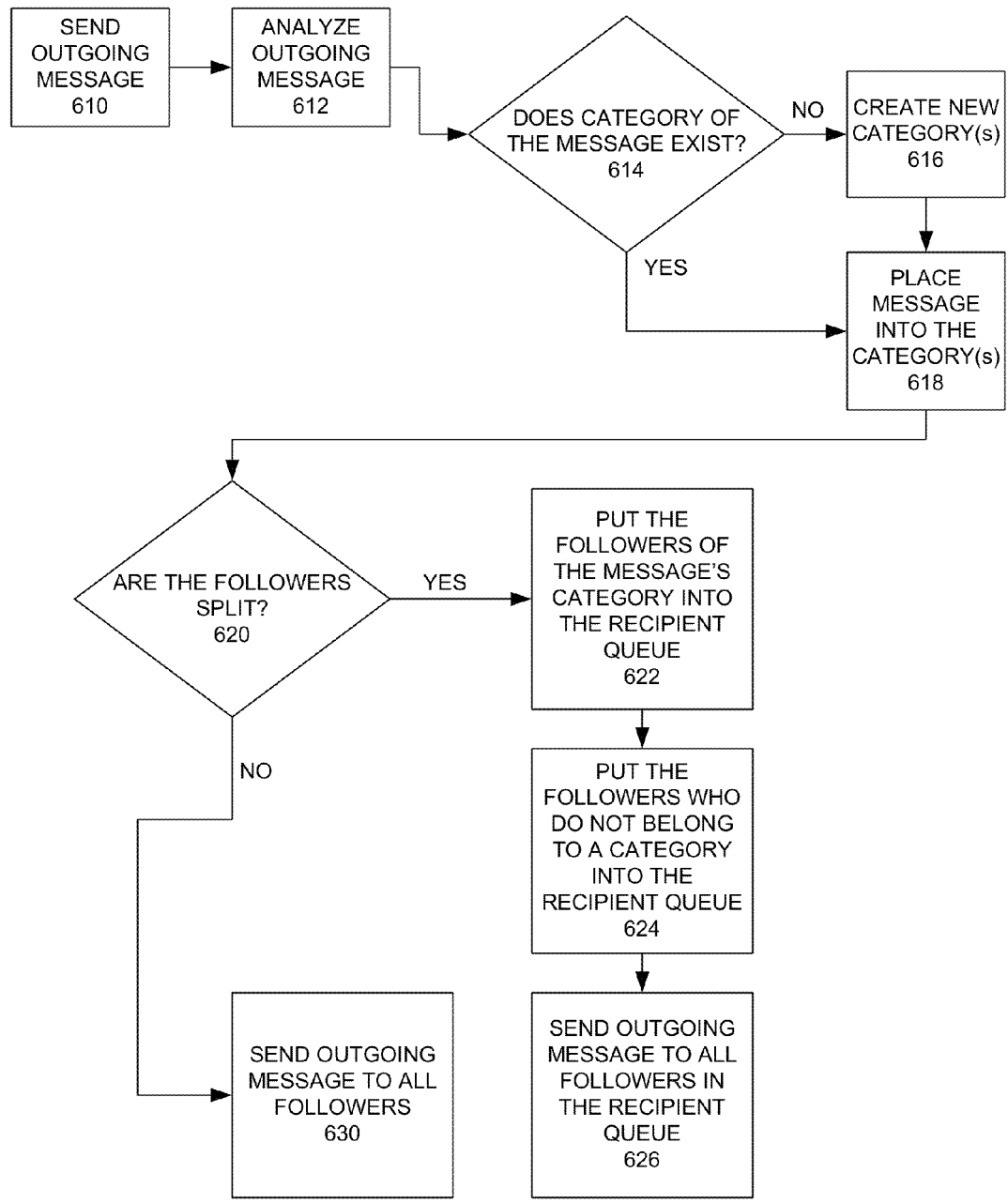
FIG. 6 illustrates a flow diagram of an example method of operation, according to example embodiments of the present invention

When sending an outgoing message, the flowchart of FIG. 6, illustrates a logic flow for sending an outgoing message according to example embodiments. Referring to FIG. 6, the procedure for sending a user's message is depicted. The process begins when a user of the managing application sends out a message 610. The message is analyzed 612, broken into tokens (parsed) and split into categories based on a determination of whether the category of the message exists 614. The managing application determines if the category(s) of the message exists and ff the category(s) does exist, the outgoing message is placed into the internal category table(s) 618. If the category(s) does not exist, the new category(s) is created 616 and then placed into the category(s) of the internal table 618.

The managing application then determines if the followers of the leader have previously been split 620. If the followers have not been split, then the outgoing message is sent to all followers 630, and the process is complete. If the followers have previously been split, then an internal array, 'recipientQueue[ ]' is created that holds the objects representing the followers that should receive the outgoing message. First, using the internal category table, the object of the followers of the message's category are placed into the 'recipientQueue[ ]' 622. The managing application then places all of the objects of the followers who do not belong to a category into the 'recipientQueue[ ]' 624 (note this may be optionally performed) or into a different queue so as not to receive the message (not depicted and may be optionally performed).

The outgoing message is sent to all of the objects residing in the recipientQueue 200 and the process is complete 626.

The followers/data recipients 104 are split according to the settings that the leader 101 has specified in the configuration portion of the managing application of the current invention. The internal category table is created upon initiation of the managing application, and is filled with data as the leader 101 interacts with the managing application. The category table (see FIGS. 4 and 5) is utilized when it is determined that the data recipients 104 should be split and will be referenced to determine to which of the data recipients 104 the outgoing message should be sent.

When splitting the data recipients 104, the internal category table 500 is utilized to determine the followers that should receive the messages according to the leader's posts. Those data recipients 104 who have not been placed in the table, indicating that they have not responded to an outgoing message, or have not forwarded an outgoing message will continue to receive all outgoing messages. In another example, the data recipients 104 that have not been associated with a category will continue to receive all outgoing messages from the user for a predetermined amount of time or a predetermined number of outgoing messages, sent by the leader 101 at a configuration window of the application (not shown). After the predetermined time has elapsed, the data recipients 104 are presented with a window allowing one or more of the following actions: continue receiving all messages, choose a category that the data recipients 104 can select to receive only those outgoing messages pertaining to that category, and stop receiving all outgoing posts.

Figure 7:
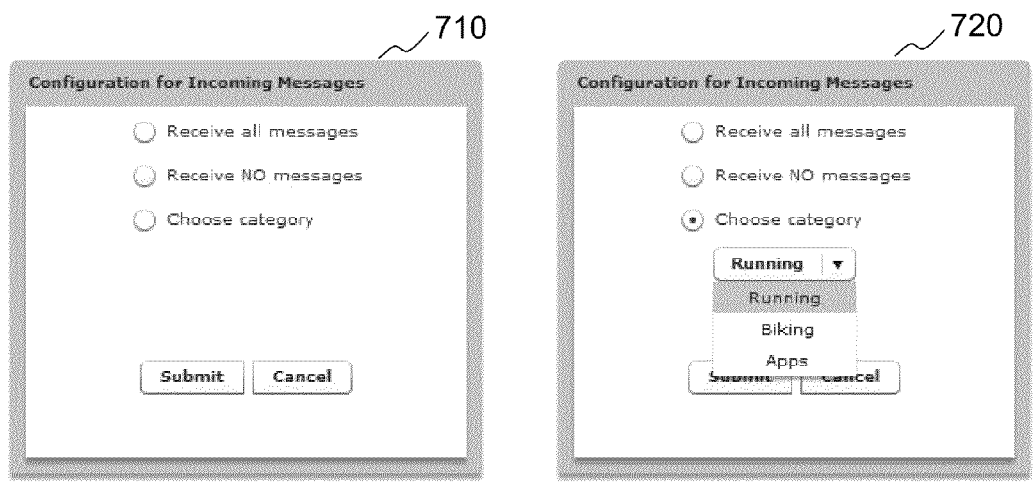
FIG. 7 illustrates example graphical user interfaces (GUIs) used to manage recipient data, according to an example embodiment of the present invention.

A depiction of the GUI window presented to the data recipients 104 is illustrated in FIG. 7. Referring to FIG. 7, the data recipients 104 may receive incoming messages and be prompted to select an option for future messages received. GUI windows 710 and 720 illustrate a configuration window that is displayed for data recipients 104 that has not been placed in the category table. The managing application will query the data recipients 104 to determine the interest that each data recipient has. After a configurable amount of time, these windows allow the data recipients 104 to select whether or not it is desired to continue to receive all messages, receive no future messages, or choose a specific category(s) that is of interest.

GUI 710 provides buttons permitting the data recipient to select the desired messages. The first button allows the data recipient to continue to receive all messages from the leader. The second button allows the data recipient to stop all incoming messages from the leader. The third button allows the data recipients to select the category(s) that is/are desired.

If the third button is selected, the second GUI 720 shows a drop down that is displayed to the data recipient. The data recipient is then able to select which category(s) that is desired. The data recipient is able to hold down the control button to select multiple categories. In another example, the data recipients presented with the above configuration GUI is able to suggest another sub-category which was not included in the list of categories. The GUI 720 presented to the data recipients as an additional text-entry component [not depicted] allows the data recipient to enter in the name of the new category. The text-entry component allows comma delimited text so the data recipient is able to suggest more than one new category.

The new category entered by the data recipient is sent back to the leader. The managing application receives the new category(s) and allows the leader to accept or deny the suggested category(s). A GUI window (not depicted) is presented to the leader that shows the suggested category(s). The leader has the option to accept none, one, or more of the suggested categories. If the new category(s) is/are accepted by the leader, the new category(s) is/are written into the category table.

The categories displayed to the leader are obtained by the managing application in the internal table. Communication between the managing application and the data recipients 104 is supported by the use of sockets. In general, sockets provide a way to send data from the managing application to a client. Sockets allow the managing application to make a single request, and the managing application opens a connection and maintains it so that data can be pushed to the client whenever it desires. Both the managing application and the client bind to a single socket so both parties can listen for changes in information, and both the client and the managing application can send information over that socket whenever desired.

The use of sockets require the use of extra steps due to security concerns. A policy file is created that is sent to the client upon request. The policy file contains information about who is allowed to connect and on which ports to make the connection. Once a policy file is created, a bind to a host and a specific port is needed. In this example, the managing application is going to request the data from port number 843. After the binding operation, the managing application listens on the bound socket for any data that the leader might send.

Once the socket is set up correctly, data can be sent and received. Socket communication is very different from the request-response model normally utilized in the HTTP protocol. Unlike a typical PHP page that loads in a browser when the browser requests it, socket communication is continuous. As a result, it is never desired to complete the loading of the page. To achieve that end, the rest of the code is placed in a 'while' loop that continues to run, accepting any connections that arise.

Within that 'while' loop, a connection is necessary to be created accepting any tries to connect to the socket. If the connection is successful, a connection object that you can then read from or write to is established. The use of sockets allows the managing application to push data to the data recipients 104. In one example, the socket would push data to the GUI 710/720 allowing the data recipients 104 to configure future messages, and to send the configuration (including any newly suggested categories) back to the managing application.

The managing application determines the data recipients' personal interests by examining any or all of: ads that have been served to the follower's email program, ads that the follower clicked on, searches requested groups that the follower is a member of, emails that the follower sent or received, calendar events that the follower is subscribed to, historical surfing habits, current location of the follower, online games that the follower has shown interest in, DVR, live video streaming/IPTV, web based shows and GPS (Cellular). One way to use the history of the data recipients' online surfing is though the history on the data recipients' computers. All web browsers retain Internet surfing information in the form of cache files, or cookies stored on the data recipients' 104 computer. These files can be scanned to determine information that will aid the application in creating a dynamic web page.

Other methods can be employed to gain an understanding of the data recipients 104 previous Internet surfing history. Google and Yahoo, for instance, offer free services that followers can utilize to perform email capabilities, manage groups, search the web, manage advertisements, manage calendar activities, manage documents, as well as many other services. Data associated with these services can be interworked with the application to gain knowledge of the follower's interests. Utilizing the data collected, the managing application may be able to provide more accurate placing for the data recipients 104 into the proper groups.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 2:
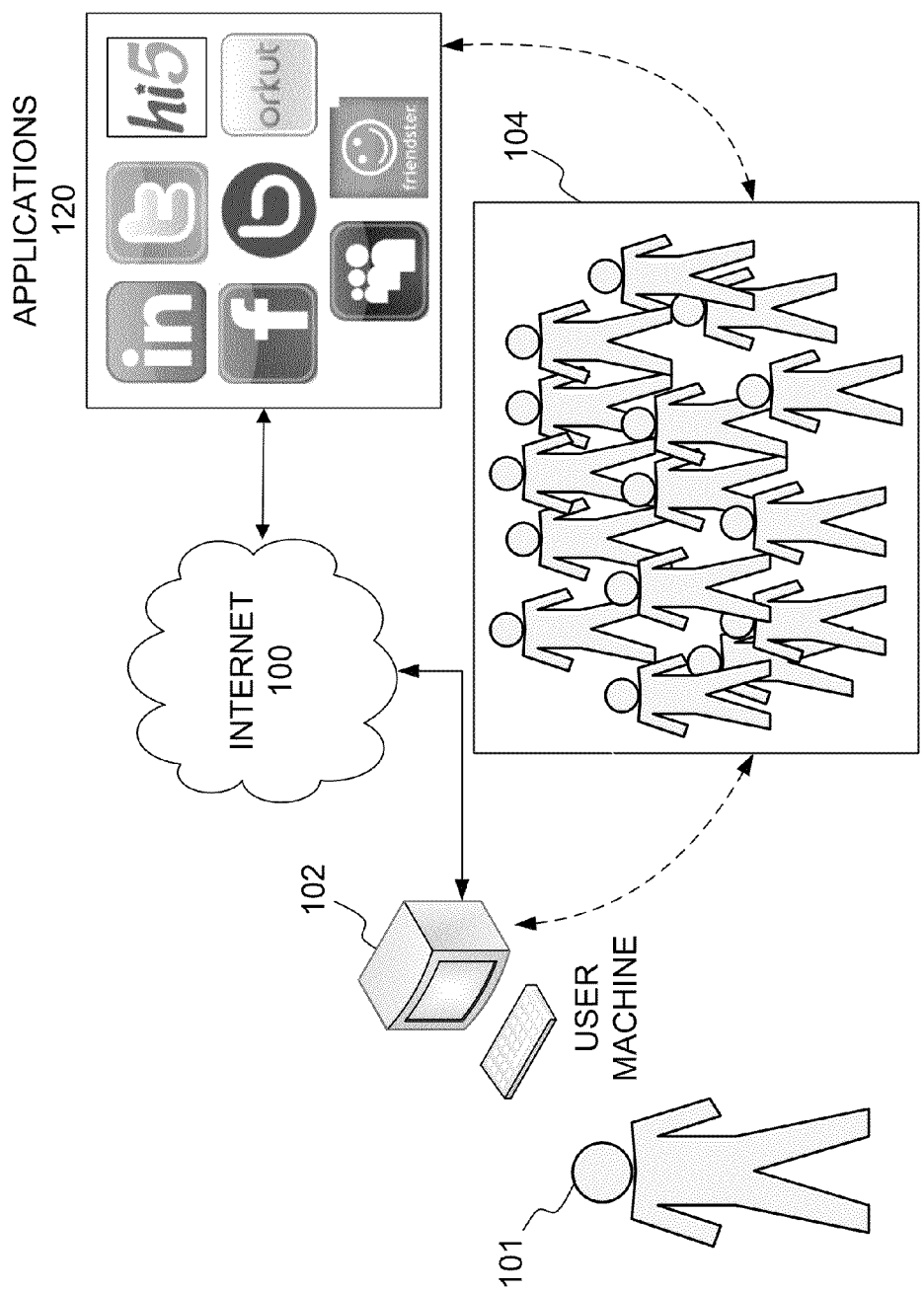
FIG. 2 illustrates an example data network used for social networking applications, according to example embodiments of the present invention.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components of FIG. 2.

Figure 8:
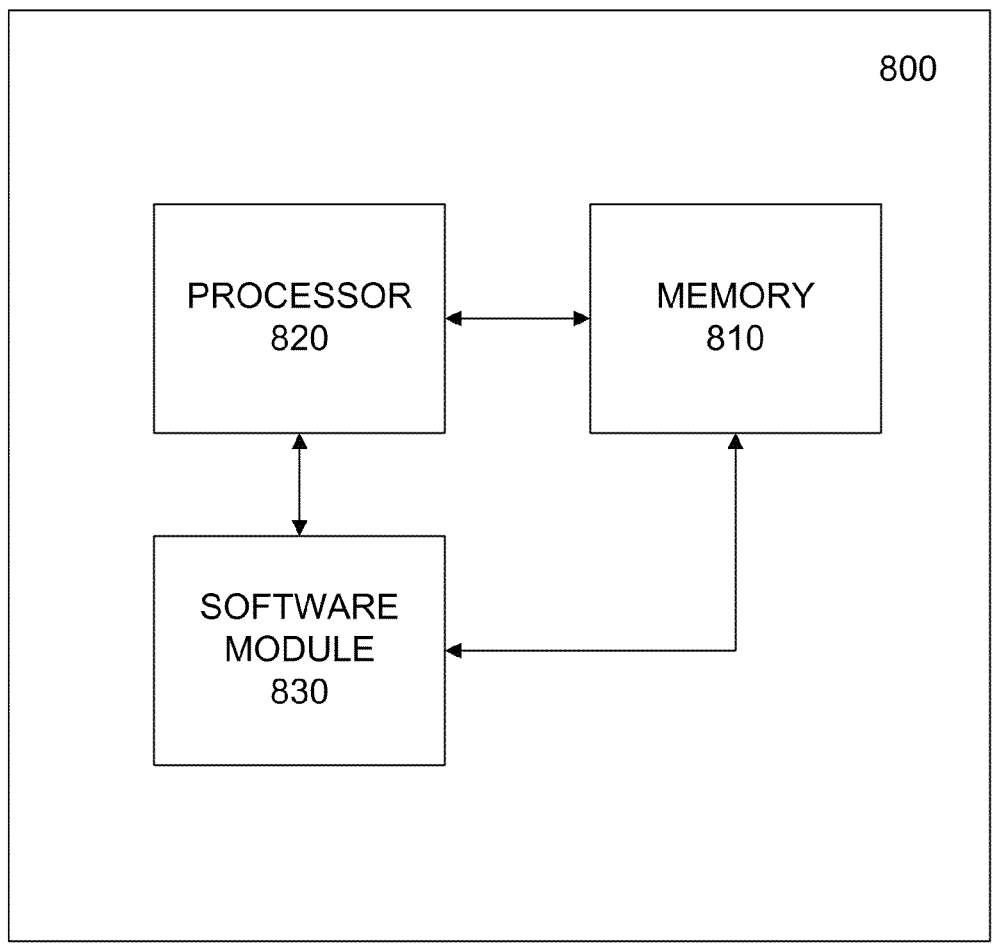
FIG. 8 illustrates an example network entity device configured to store instructions, software, and including corresponding hardware for performing various operations, according to example embodiments of the present invention.
Figure 9:
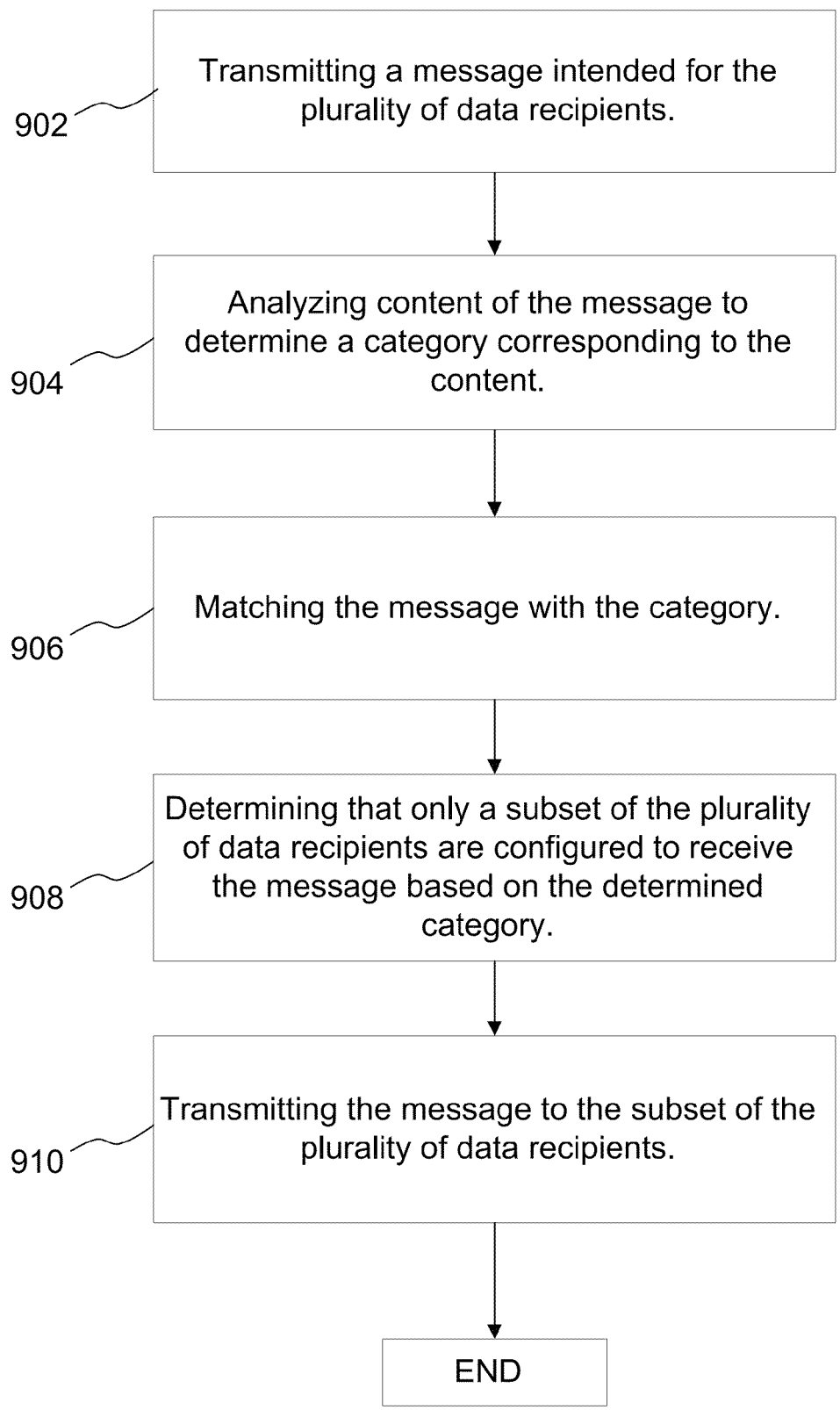
FIG. 9 illustrates a flow diagram of an example method of operation, according to example embodiments of the present invention

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

One example method of operation may provide a method of transmitting a message to a plurality of data recipients subscribed to receive information from a leader. The method may include transmitting a message intended for the plurality of data recipients, at operation 902, analyzing content of the message to determine a category corresponding to the content, at operation 904, matching the message with the category, at operation 906, determining that only a subset of the plurality of data recipients are configured to receive the message based on the determined category, at operation 908 and transmitting the message to the subset of the plurality of data recipients, at operation 910.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of transmitting a message to a plurality of data recipients subscribed to receive information from a leader, the method comprising:

transmitting a message intended for the plurality of data recipients;

determining whether the plurality of data recipients are split into at least two groups comprising a subset of the plurality of data recipients configured to receive the message and a subset of the plurality of data recipients configured not to receive the message;

analyzing content of the message to determine a category corresponding to the content, wherein the analyzing further comprises determining if the category currently exists and if not, creating a new category and matching the message with the category;

matching the message with the category associated with at least one predetermined topic of interest;

determining that only the a subset of the plurality of data recipients are configured to receive the message based on the predetermined topic of interest by identifying the subset of the plurality of data recipients as being members of a particular special interest group identifying the at least one topic of interest;

placing the subset of data recipients configured to receive the message into a recipient queue comprising objects representing the plurality of data recipients; and transmitting the message to the subset of the plurality of data recipients based on the objects in the recipient queue;

wherein if the subset of the plurality of data recipients are not configured to receive the message, transmitting the message to all of the plurality of data recipients.

2. The method of claim 1, wherein the predetermined topic of interest is created by the leader.

3. The method of claim 1, further comprising:

not transmitting the message to remaining data recipients who are not configured to receive the message.

4. The method of claim 1, further comprising:

storing the category in a table and associating the category with the message and at least one data recipient also stored in the table.

5. An apparatus configured to transmit a message to a plurality of data recipients subscribed to receive information from a leader, the apparatus comprising:

a transmitter configured to transmit a message intended for the plurality of data recipients;

a memory; and a processor communicably coupled to the memory, wherein the processor is configured to analyze content of the message to determine a category corresponding to the content, wherein the analyze the content further comprises a determination if the category currently exists and if not, a creation of a new category and a match of the message with the category, determine whether the plurality of data recipients are split into at least two groups comprising a subset of the plurality of data recipients configured to receive the message and a subset of the plurality of data recipients configured not to receive the message;

match the message with the category associated with at least one predetermined topic of interest, determine that only the a subset of the plurality of data recipients are configured to receive the message based on the predetermined topic of interest by identifying the subset of the plurality of data recipients as being members of a particular special interest group identifying the at least one topic of interest, place the subset of data recipients configured to receive the message into a recipient queue comprising objects representing the plurality of data recipients, and wherein the transmitter is also configured to transmit the message to the subset of the plurality of data recipients based on the objects in the recipient queue;

wherein if the subset of the plurality of data recipients are not configured to receive the message, the processor is configured to transmit the message to all of the plurality of data recipients.

6. The apparatus of claim 5, wherein the predetermined topic of interest is created by the leader.

7. The apparatus of claim 5, wherein the transmitter does not transmit the message to remaining data recipients who are not configured to receive the message.

8. The apparatus of claim 5, wherein the processor is further configured to store the category in a table and associate the category with the message and at least one data recipient also stored in the table.

9. A non-transitory computer readable storage medium configured to store instructions that when executed cause a processor to perform transmitting a message to a plurality of data recipients subscribed to receive information from a leader, the processor being further configured to perform:

transmitting a message intended for the plurality of data recipients;

analyzing content of the message to determine a category corresponding to the content, wherein the analyzing further comprises determining if the category currently exists and if not, creating a new category and matching the message with the category;

determining whether the plurality of data recipients are split into at least two groups comprising a subset of the plurality of data recipients configured to receive the message and a subset of the plurality of data recipients configured not to receive the message;

matching the message with the category associated with at least one predetermined topic of interest;

determining that only the a subset of the plurality of data recipients are configured to receive the message based on the predetermined topic of interest by identifying the subset of the plurality of data recipients as being members of a particular special interest group identifying the at least one topic of interest;

placing the subset of data recipients configured to receive the message into a recipient queue comprising objects representing the plurality of data recipients; and transmitting the message to the subset of the plurality of data recipients based on the objects in the recipient queue;

wherein if the subset of the plurality of data recipients are not configured to receive the message, transmitting the message to all of the plurality of data recipients.

10. The non-transitory computer readable storage medium of claim 9, wherein the predetermined topic of interest is created by the leader.

11. The non-transitory computer readable storage medium of claim 9, wherein the processor is further configured to perform:

not transmitting the message to remaining data recipients who are not configured to receive the message.

* * * * *